United States Patent

Lópéz Ascaso et al.

Patent Number: 6,026,722
Date of Patent: Feb. 22, 2000

[54] MACHINE FOR CUTTING ELECTRIC BATTERY PLATES FROM METAL STRIP PASSING BETWEEN PARALLEL ROLLERS

[75] Inventors: José Miguel López Ascaso, Horche; Emilio Saénz López, Madrid, both of Spain

[73] Assignee: Sociedad Espanola Del Acumulador Tudor, S.A., Madrid, Spain

[21] Appl. No.: 08/984,740

[22] Filed: Dec. 4, 1997

[51] Int. Cl.[7] .................................................. B26D 7/06
[52] U.S. Cl. ................ 83/100; 83/298; 83/343; 83/344; 83/423; 429/225; 429/246
[58] Field of Search ............... 83/423, 332, 343, 83/344, 346, 100, 426, 298, 226; 429/246, 225

[56] References Cited

U.S. PATENT DOCUMENTS

| | | | |
|---|---|---|---|
| 623,862 | 4/1899 | Armstrong | 83/346 X |
| 909,957 | 1/1909 | Staude | 83/323 X |
| 1,286,377 | 12/1918 | Malm | 83/344 X |
| 1,482,776 | 2/1924 | Abraham | 83/343 X |
| 1,592,095 | 7/1926 | Funk | 83/346 X |
| 2,145,048 | 1/1939 | Hagen | 83/343 X |
| 2,682,306 | 6/1954 | Schriber | 83/346 |
| 3,106,121 | 10/1963 | Novick | 83/346 X |
| 3,257,885 | 6/1966 | Hornung | 83/346 |
| 3,774,485 | 11/1973 | Kercher | 83/423 X |
| 4,143,568 | 3/1979 | Cogswell | 83/344 X |
| 4,241,629 | 12/1980 | McDowell | 83/343 X |
| 4,275,629 | 6/1981 | McDowell | 83/343 X |
| 4,308,773 | 1/1982 | McDowell | 83/343 X |
| 4,464,961 | 8/1984 | Tole et al. | 83/423 X |
| 4,589,863 | 5/1986 | Hodges | 83/332 X |
| 5,088,367 | 2/1992 | Cracchiolo et al. | 83/343 X |
| 5,144,874 | 9/1992 | Garrett | 83/332 X |
| 5,201,259 | 4/1993 | Covert et al. | 83/423 X |
| 5,452,634 | 9/1995 | Wilson | 83/346 X |
| 5,540,127 | 7/1996 | Binder et al. | 83/423 X |
| 5,570,620 | 11/1996 | Okonski et al. | 83/346 X |

Primary Examiner—M. Rachuba
Attorney, Agent, or Firm—Darby & Darby

[57] ABSTRACT

A machine for cutting electric battery plates, comprising two rollers (17, 18), between which a metal strip (20) passes. The metal strip is provided with a row of holes (22) running down the center, separated by bridges (31). The lower roller (17) is provided with means for removing cut-away pieces. A disk that is selectively circumferentially positioned is mounted on the lower roller. Lugs (21) project radially from the disk to pull the strip (20) along. Cutter plates (25, 26) are mounted on the upper roller. The cutter plates are provided with blades (29, 30) that cut the strip (20) and the bridges (31) transversely to yield plates (32) with their respective tabs (33). Inserts (35, 36) are provided under the cutter plates.

7 Claims, 6 Drawing Sheets

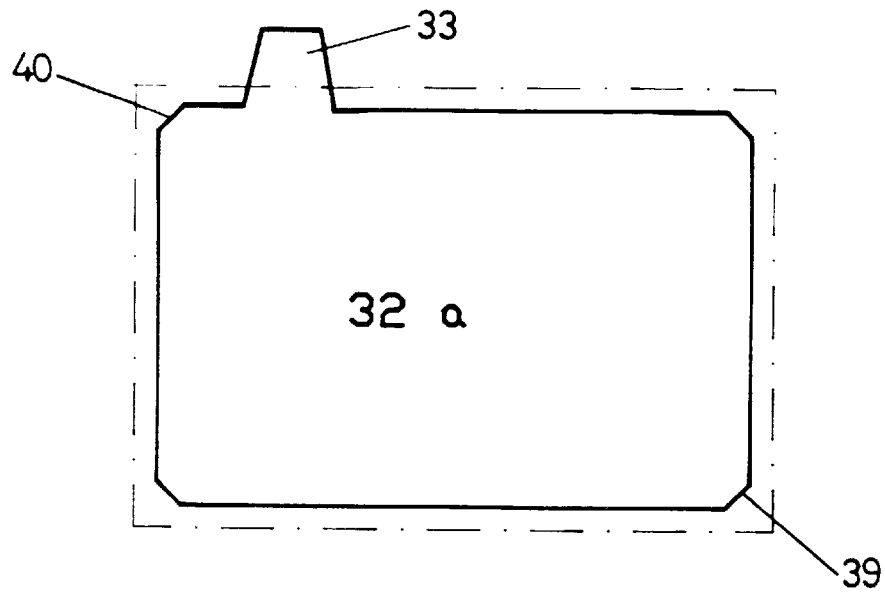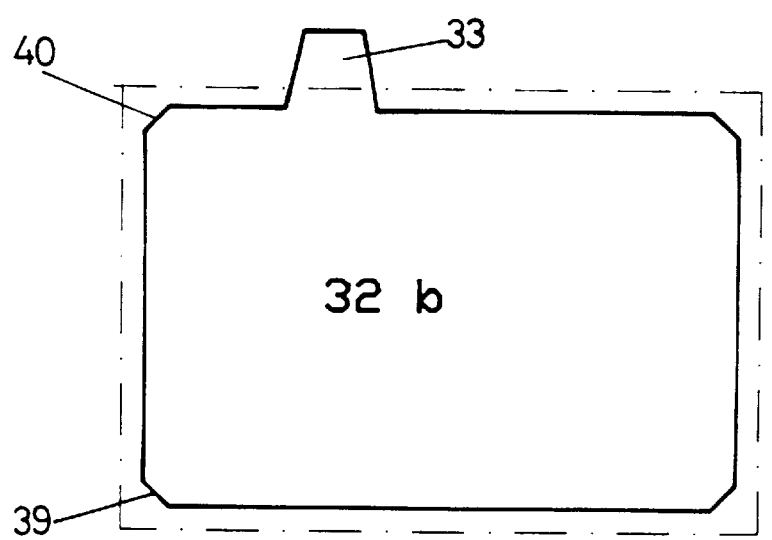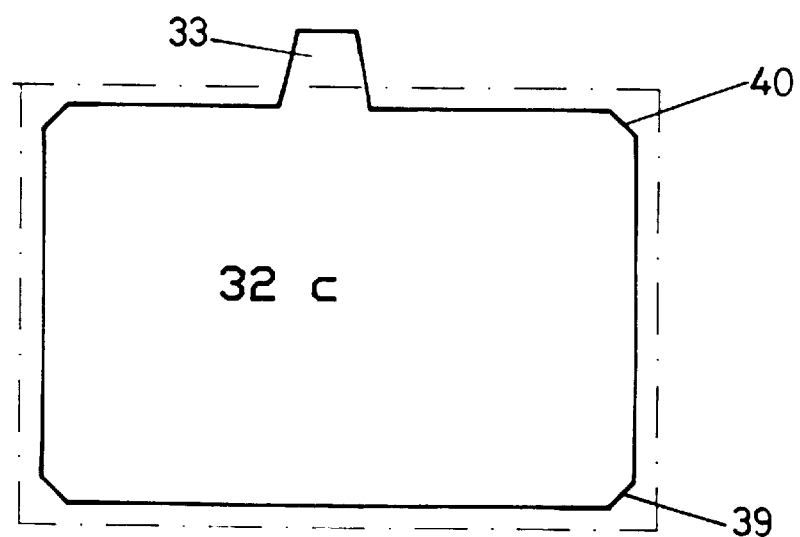
FIG. 3

MACHINE FOR CUTTING ELECTRIC BATTERY PLATES FROM METAL STRIP PASSING BETWEEN PARALLEL ROLLERS

FIELD OF THE INVENTION

The present invention relates to a machine for cutting electric battery plates, specially designed to be used on a production line for manufacturing positive and negative expanded metal plates from a strip of a given length.

The metal strip from which the plates are formed is produced by a casting process starting with a melting pot that feeds a strip caster, in which the lead is kept molten and clean at a constant level and temperature. A cooled roller is introduced into said strip caster, solidifying the layer of lead that comes into contact with its surface. Rotating the roller at a proper speed produces a wide, continuous sheet that is cut lengthwise to obtain strips of the desired width. The strips are coiled and palletized. Usually, the strips are wide enough transversely to yield two plates with their respective tabs. The melting pot is fed with alloy ingots and trim recycled from the plate cutting process.

The coils produced by the foregoing process are the starting material from which the positive and negative plates of the batteries are manufactured.

A typical production line for manufacturing such plates comprises a coil unwinder, a metal-arc inert-gas welding station, an expander, a tab cutter, a paster, a tab cleaner, a plate cutter, a plate flattener and a drying oven; the plates are then stacked and palletized.

The metal strips are unrolled using the coil unwinder, and the transverse edges of consecutive strips are joined by the welding machine, so the strips can be processed continuously.

The elements that are later to become the grid elements of the conductive mesh of the plate grid are cut longitudinally on the expander, while transverse groups of three projections are marked. The center projection is used to guide the strip during the process that follows, while the side projections are inserted into chains that pull transversely on the strip, causing it to expand and create a continuous mesh. The side projections are cut off once the strip has been expanded.

The expanded strip is then put through a punching machine that makes a row of identical, equidistant rectangular holes running down the center of the strip, separated by bridges that will later form the tabs on the plates. The center projection is also flattened during this step.

The paster applies a paste made from lead oxide, water, acid and additives to the plate grids. Once the paste has been applied to the strip, liner papers are applied to both surfaces to facilitate handling and to keep the paste from coming off and sticking to the machinery during subsequent steps of the process.

The tab cleaner is used to clean the bridges that separate the holes in the strip, removing paste residue that would later interfere with welding the tabs to the battery straps.

The plate cutter cuts the strip as required to give the plates their final profile.

BACKGROUND OF THE INVENTION

U.S. Pat. No. 5,384,217 describes a plate cutter comprising two parallel rollers, one on top of the other, which rotate at the same speed, and between which the metal strip passes. The lower roller is provided with circumferentially-spaced central lugs that project radially and engage holes in the strip to pull it along. The upper roller, in turn, is provided with cutter blades projecting from its cylindrical surface, which make lengthwise and transverse cuts in the metal strip between the lengthwise edges and the row of holes running down the center of said strip, to form the pasted plates with their respective tabs.

The outside end of the blades that make the transverse cuts is finished off in a V-shape, to cut the lower corners of the plates. The upper roller is also provided with means for removing the cut-away corners by suction and collecting them in chambers at the ends of the roller.

In the case of the machine described in the cited patent, each time a cutter blade on the upper roller is damaged or wears out, said roller must be replaced with a new one. The production line has to be stopped for a relatively long period of time to perform such operation. Furthermore, having to replace the whole roller considerably increases the cost of the process.

In addition, the fact that the means for removing the trim are on the upper roller exacerbates the aforementioned problems. Moreover, since the cutter blades are formed on the roller itself, a different roller is needed for each type of plate, especially where such types relate to the position and height of the tabs on the plates.

SUMMARY OF THE INVENTION

The object of the present invention is to overcome the disadvantages described above by means of a machine designed in such a way that the upper roller does not have to be replaced if the cutter blades are damaged, thus reducing repair time and costs.

Another object of the invention is to simplify the machine's structure and operation, by positioning the means for removing the cut-away pieces more suitably and effectively.

A further object of the invention is the ability to produce plates with tabs of different heights in different positions for batteries of different formats, without having to change the cylindrical cutter.

It is also an aim of the invention to provide a plate of the type described herein, having four rounded or smoothed off corners, thus eliminating the risk of the separator being torn during battery assembly or the life of the battery, as a result of the vibration to which it is subjected.

The machine according to the present invention comprises two parallel rollers, one on top of the other, which rotate at the same speed, and between which the metal strip from which the plates are to be cut passes. A row of holes runs down the center of the strip. Said holes are engaged by central lugs that project radially from the lower roller, to pull the strip along. The upper roller is provided with means for cutting the metal strip.

According to the present invention, the lugs on the lower roller that pull the strip along are formed from a single piece with a center disk mounted on said lower roller. Said disk can be mounted in a selected circumferential position around said lower roller. With this feature, the radially-projecting lugs can be moved forward or back by selecting the position of the center disk, thereby shifting the position of the tab forward or back on the plate to be cut in a subsequent step.

Thus, plates with tabs in different positions can be produced simply by remounting the disk with the lugs on the lower roller.

According to another aspect of the invention, the lower roller is provided with means for removing the cut-away pieces. Said means comprise suction holes on the lower roller, from which conduits run inside said roller and through a distributor to selectable sources of suction or compressed air.

With the means for removing the cut-away pieces disposed on the lower roller, the cut-away pieces rest against the lower roller by their own weight, and are held there by suction through the aforementioned holes. When the cut-away pieces clinging to the roller pass through the lower part of the machine, compressed air is blown through the aforementioned conduits and holes, and the cut-away pieces become detached and fall into a collection basket underneath, aided by their own weight.

According to a further aspect of the invention, the cutting means comprise cutter plates mounted on the cylindrical surface of the upper roller. The curvature of said plates matches the curvature of the cylindrical surface of the roller, and the outer surfaces of said plates are provided with cutter blades for cutting the metal strip. The cutter plates are also drilled through with holes for screws fastening them to the rollers.

The cutting means may comprise main cutter plates and auxiliary cutter plates.

The main cutter plates are positioned alternately on either side of the centerline of the metal strip. The cutter blades on said plates are aligned axially and sized to cut the strip transversely between the adjacent outside edge and the holes between the plates being cut from said strip.

The auxiliary cutter plates are positioned between the main cutter plates on either side of the centerline of the metal strip. Said auxiliary cutter plates are provided with cutter blades that are aligned circumferentially and positioned to cut transversely the bridges between the plates being cut from said strip, to form the tabs on the plates.

In addition, backing inserts are provided between the roller and cutter plate on both the main and auxiliary cutter plates. Said backing inserts are of uniform thickness and have the same profile, curvature and holes as the cutter plates. The thickness of said inserts determines the radial position of the edge of the cutter blades.

With the design described above, the length of the tabs can be altered simply by switching the auxiliary plates, which can be done quickly and easily using the screws that fasten said plates down.

Furthermore, if a cutting blade is broken or worn out, the plate on which the bad blade is mounted can simply be replaced with a new one.

Any of the operations described above can be carried out very quickly, without having to replace the entire upper cylindrical cutter.

BRIEF DESCRIPTION OF THE DRAWINGS

The features of the invention presented above may be better understood with the aid of the following description with reference to the accompanying drawings, which show one embodiment of the invention and are not intended to limit the scope of the invention.

In the drawings:

FIG. 3 shows three plates produced according to the invention, with tabs of different heights in different positions.

DETAILED DESCRIPTION OF THE INVENTION

Figure 1:
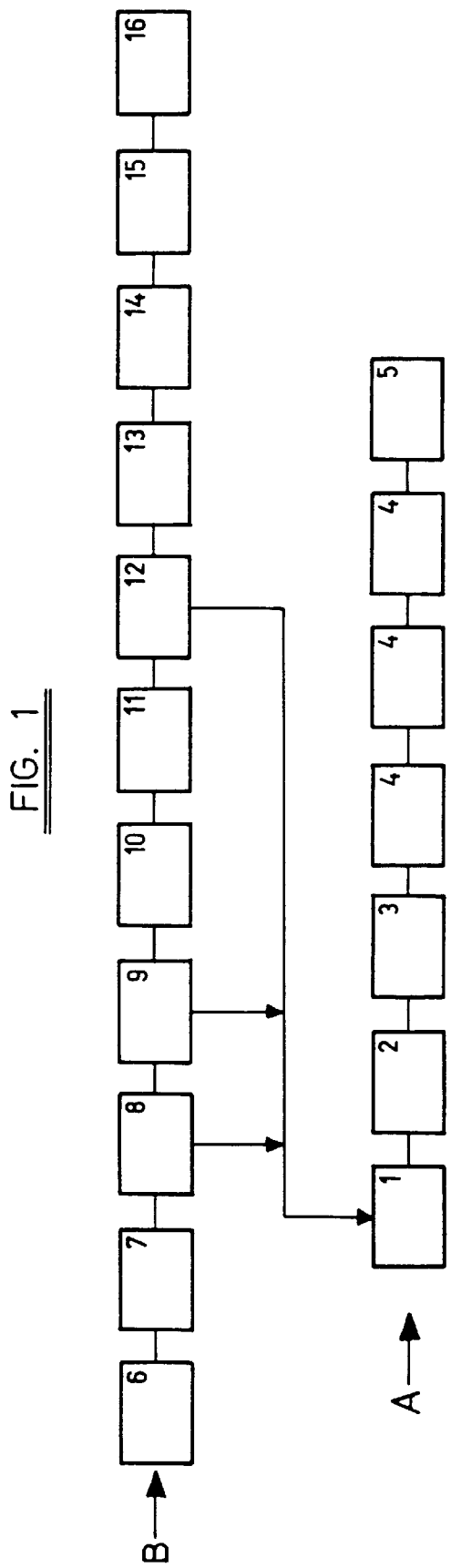
FIG. 1 is a schematic diagram of a casting line and a production line for manufacturing electric battery plates.

In the diagram in FIG. 1, letter A denotes the casting line in general, and letter B denotes the plate production line per se in general.

The casting line A comprises a holding pot 1 and a melting pot 2, which feeds a strip caster 3, in which the lead is kept molten and clean at a constant level and temperature. A cooled roller is introduced into said strip caster, solidifying the layer of lead that comes into contact with its surface. Rotating the roller produces a wide sheet that is cut into, e.g., three strips, which are coiled on the same number coil winders 4 for palletizing 5, as the final step.

The expanded plate production line starts with a coil unwinder 6, next to which comes a metal-arc inert-gas welding station 7 for joining the transverse edges of consecutive strips together. The metal strip is introduced into the expander 8, in which the elements that will later become the tabs or conductive mesh of the plate grid are cut, and three projections are marked. The center projection is used to guide and pull the strip along when inserted into the center chain, while the side projections are inserted into chains that diverge and pull transversely on the strip, causing it to expand and create a continuous mesh. The two side projections are cut off once the strip has been expanded, and are melted in the holding pot 1.

The expanded strip passes through a tab cutter 9, which continuously cuts away the lead between tabs, and the cut-away pieces are collected and melted in the holding pot 1. The mesh then passes through the paster 10, where a paste made from lead oxide, water, acid and additives is applied to it. Liner papers are applied to both surfaces of the pasted strip to facilitate handling and keep the paste from sticking to the rest of the machinery.

Paste is cleaned off the tabs in the tab cleaner 11, so a good weld can be made later.

The strip then passes through the plate cutter 12, which is the subject-matter of the invention and is described in greater detail below.

The cut plates go through a flattening step 13 and are surface dried in a drying oven 14 at a temperature of approximately 200° C. The plates are then stacked in step 15, automatically palletized using a robot in step 16, and subsequently cured.

Figure 2:
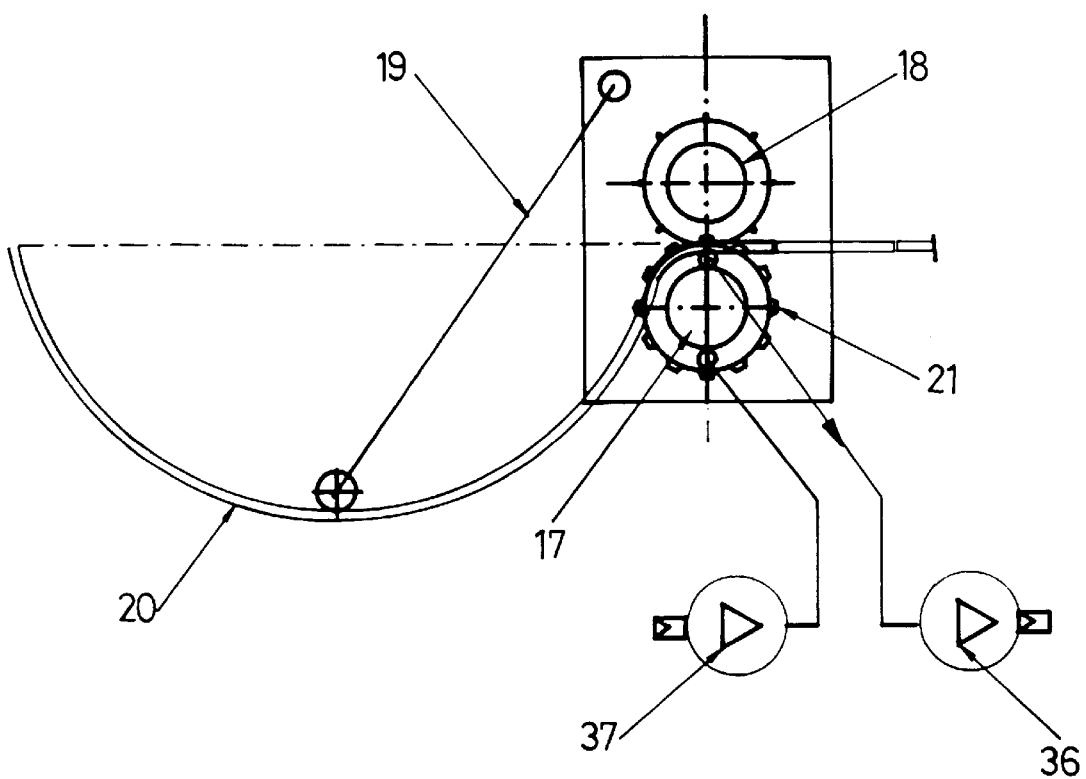
FIG. 2 is a schematic side elevation view of the plate divider shown in FIG. 1.

FIG. 2 shows a side view of a plate divider comprising a lower roller 17 and an upper roller 18, which are parallel and one on top of the other, and rotate at the same speed. The speed is controlled by the regulator arm 19, which rests on top of the strip 20 to be cut. Varying the inclination of the regulator arm 19 increases or decreases the speed of the rollers 17 and 18.

The lower roller 17 acts as a cutting anvil during the cutting process, while the upper roller 18 does the cutting, and guides the strip 20 by means of lugs 21 that project radially and engage the holes 22 (in FIG. 4) in the metal strip 20.

Figure 4:
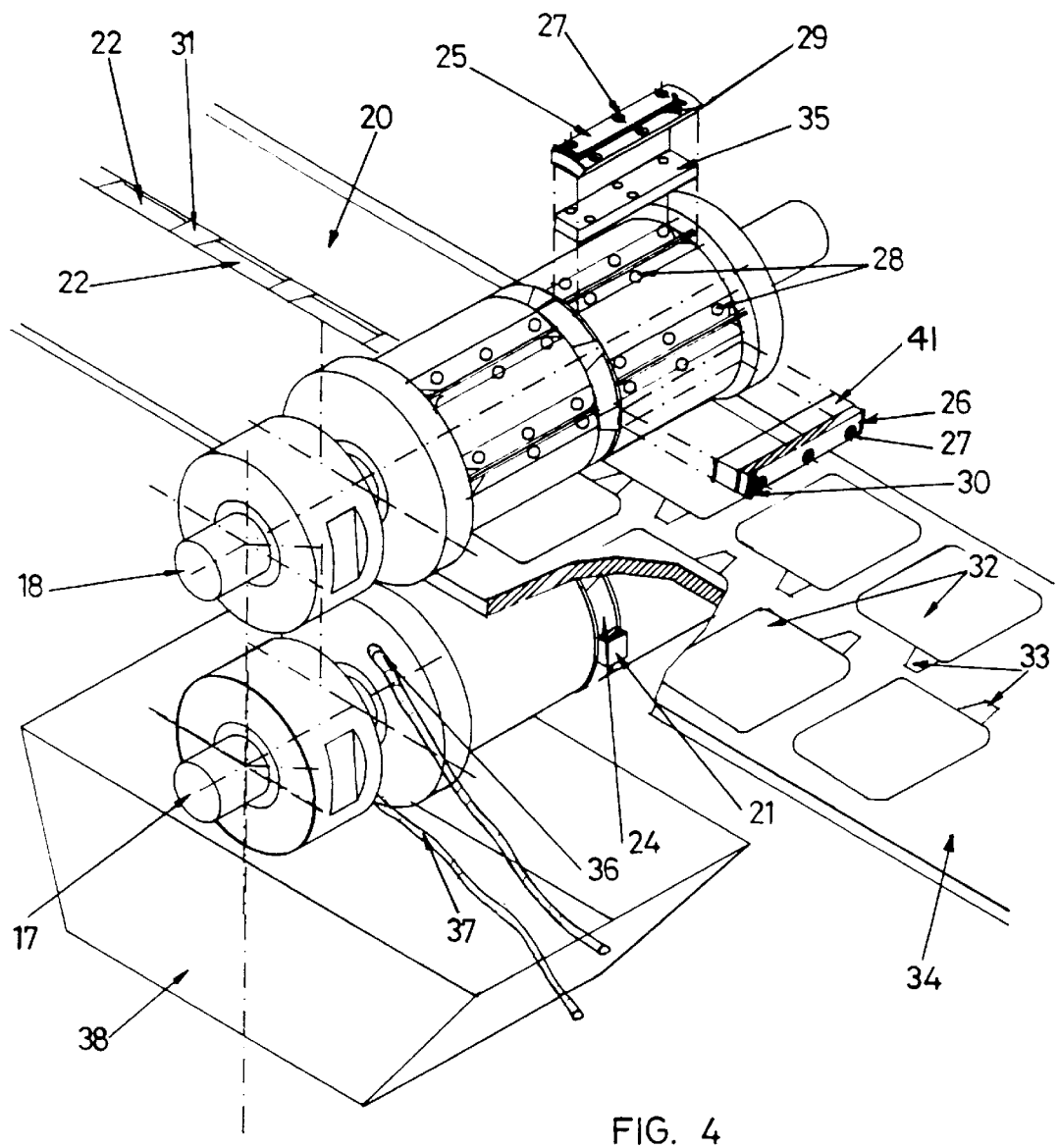
FIG. 4 is a schematic perspective view of the plate cutter or divider according to the invention.

According to a first aspect of the invention, the radially-projecting lugs 21 are formed on a disk 24 (in FIG. 4)

mounted in the center of the lower roller 17 in a selectable circumferential position.

Changing the circumferential position of the disk 24 moves the lugs 21 forward or back, thereby shifting the position of the tabs on the plates, as described below.

The upper roller 18 is provided with cutting means comprising, according to the invention, main cutter plates 25 and auxiliary cutter plates 26, with the same curvature as the surface of the roller. Said main and auxiliary cutter plates 25 and 26 are provided with holes 27 that can be matched up to holes 28 on the roller, for fastening the plates to the roller using respective screws.

The main cutter plates 25 are provided with a lengthwise blade 29 having a cutting edge. The auxiliary cutter plates 26 are provided with a circumferential cutter blade 30 used to cut the bridges 31 separating the row of holes 22 in the metal strip.

With the design described above, as the machine runs the lengthwise blades 29 of the main cutter plates 25 make transverse cuts in the strip 20 from the outer edges to the holes 22. At the same time the blades 30 of the auxiliary cutter plates 26 make a transverse cut on the bridges 31, yielding plates 32 with their respective tabs 33. The cut plates are collected and conveyed by the belt 34.

As shown in FIG. 4, inserts 35 and 41 are provided under both the main cutter plates 25 and auxiliary cutter plates 26, having the same curvature, profile and holes as the plates. The thickness of the inserts determines the radial position of the cutting edge of the blades 29 and 30.

With the design described above, when a cutter blade wears out, one need only replace the affected plate using the fastening screws.

In addition, the radial position of the edge of the cutter blades can be varied by adjusting the thickness of the inserts 35 and 41. This feature makes it possible to get the most out of the cutter plates and blades, increasing the thickness of the inserts 35 and 41 as the blades are used up and ground down.

Furthermore, the position of the transverse cut of the bridges 31, and therefore the height of the tabs 33, can be varied simply by replacing the auxiliary cutter plates 26.

Combining such capabilities with adjusting the position of the disk 24, the cutter according to the invention can be used to produce plates 32a, 32b and 32c with tabs 33 of different heights at different distances from the transverse edges of the plate, as shown in FIG. 3.

Figure 5:
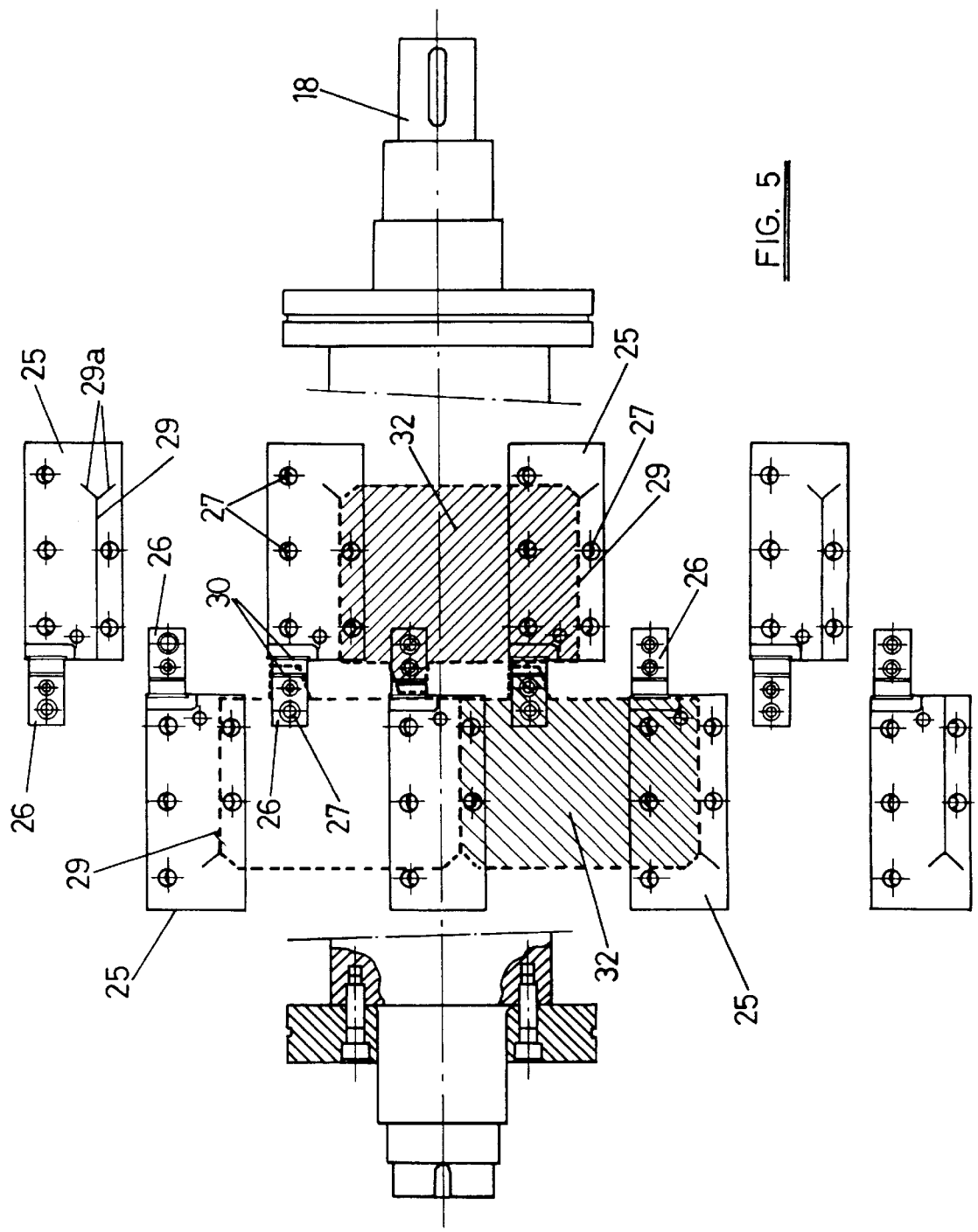
FIG. 5 is a developed view showing the position of the cutter plates on the upper roller.

FIG. 5 shows a development view of the upper cylinder 18, with the position of the main cutter plates 25 and auxiliary cutter plates 26, and their respective cutter blades 29 and 30.

The outside end of the cutter blades 29 of the main cutter plates 25 is finished off in a V-shaped bifurcation 29a, whereby the lower edges of the plates 32 are beveled or cut.

FIG. 5 shows the position of the main cutter plates 25 and auxiliary cutter plates 26, alternating on either side of the centerline of the metal strip 20, thereby producing plates 32, as shown in phantom in FIG. 5.

Figure 6:
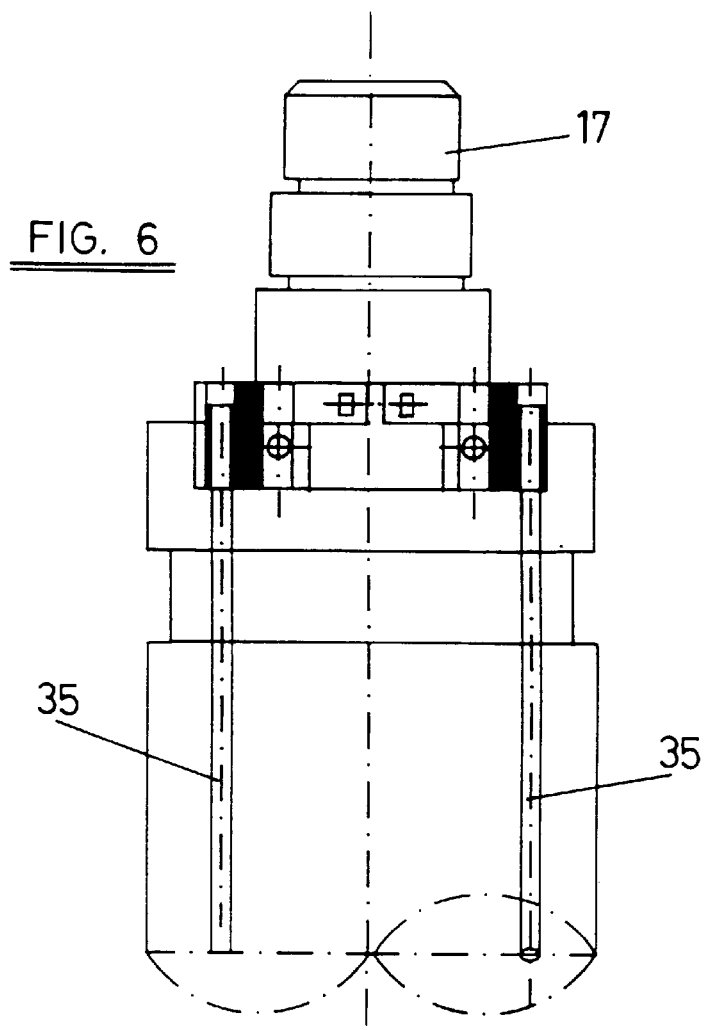
FIGS. 6 and 7 are a side view and a plan view, respectively, of the lower roller, showing the suction system for removing cut-away pieces.
Figure 7:
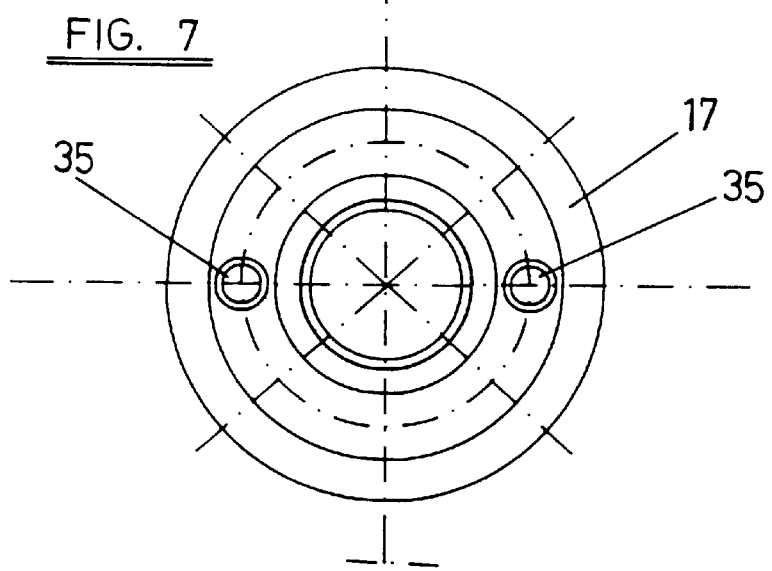

According to another aspect of the invention, the means for removing the cutaway pieces produced in the plate cutter described herein are located in the lower roller 17. Said means comprise holes on the lateral surface of the roller, from which conduits 35 run inside said rollers (FIGS. 6 and 7) through a distributor to a source of suction 36 and a compressed air source 37 (FIG. 2).

Thus, the cut-away pieces are held on the lower roller 17 when the conduits 35 are connected to the source of suction 36. When the cut-away pieces move to the underside of the cutter, they become detached when the holes and conduits 35 are connected to the compressed air source.

Cut-away pieces produced during the various steps of the production line (FIG. 1) are recycled to the holding pot 1 on the casting line.

A trough 38 may be provided under the lower roller 17 to collect the cut-away pieces, from which they are recycled to the holding pot.

According to the present invention, the cutter 9 (FIG. 1) can be used to make an angle notch in the longitudinal edges of the holes 22 in the strip 20, corresponding to the upper corners of the plates being produced. Thus, both the lower corners 39 and the upper corners 40 of the plates are beveled or smoothed off, as shown in FIG. 3.

To sum up, the cutter according to the invention can be used to produce plates with all four corners rounded off and tabs of the correct height in the correct position for subsequent welding during battery assembly.

According to the invention, both the upper and lower corners of the plate are rounded off, and the tabs can be cut to the desired length. Thus, plates of different heights can be produced in a single operation, and the position of the tab can be shifted with respect to the plate.

Moreover, the cut-away pieces can be removed more efficiently on the lower roller, since the scraps are rather heavy to be picked up using suction. The system according to the invention ensures that the cut-away pieces are completely removed, thereby eliminating perforation of the separators by scraps of lead encrusted in the paste.

In the cutter according to the invention, the lower roller functions as a cutting anvil; guides, centers and pulls the pasted strip along; and comprises the means for removing the cut-away pieces.

The upper roller of the cutter according to the invention enables maximal use and easy removal of the cutter plates, without replacing the entire roller.

NOVELTY OF THE INVENTION

Having described the present invention, we consider the claims set forth below to be novel.

We claim:

1. A machine for cutting electric battery plates that have tabs projecting therefrom from a metal strip having a longitudinal row of holes with bridges therebetween, the machine comprising:

a. parallel upper and lower rollers that synchronously rotate and between which the metal strip passes;

b. the upper roller including cutter plates removably mounted on the cylindrical surface thereof, the cutter plates having a curvature generally conforming to the curvature of the upper roller and a convex surface having cutter blades for cutting the battery plates from the metal strip;

c. the lower roller including a disk having radially projecting lugs adapted to engage the holes in the metal strip, the disk mounted to the lower roller in a selectable circumferential position so as to advance the strip between the rollers such that the cutting blades cut the strip at a selectable longitudinal position relative to the holes, the battery plates thereby having tabs at a selectable longitudinal position relative thereto; and d. the lower roller also including means for removing pieces of the battery plates cut-away from the metal strip.

2. A machine as claimed in claim 1 wherein the longitudinal row of holes is along the center of the metal strip.

3. A machine as claimed in claim 1 wherein the cutter plates include means for rounding the edges of the battery plates.

4. A machine as claimed in claim 1 wherein the cutter plates have mounting holes passing therethrough and screws mounting the cutter plates via the mounting holes.

5. A machine as claimed in claim 1, wherein the cutter plates include main cutter plates positioned alternately on either side of the centerline of the longitudinal row of holes and having cutter blades oriented axially and sized to transversely cut the strip between the adjacent outside edge thereof and the holes in the strip.

6. A machine as claimed in claim 5, wherein the cutter plates further include auxiliary cutter plates circumferentially positioned between the main cutter plates and having cutter blades oriented circumferentially and selectively positioned to transversely cut the bridges between the holes in the strip to form tabs on the plates.

7. A machine as claimed in claim 1, further comprising backing inserts between the upper roller and the cutter plates, said backing inserts being of uniform thickness and having the same profile and curvature of said cutter plates, wherein the thickness of said backing inserts determines the radial position of the edge of the cutter blades.

* * * * *